(12) United States Patent
Seki

(10) Patent No.: US 10,654,273 B2
(45) Date of Patent: May 19, 2020

(54) INK JET HEAD AND INK JET PRINTER

(71) Applicant: TOSHIBA TEC KABUSHIKI KAISHA, Tokyo (JP)

(72) Inventor: Masashi Seki, Sunto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/130,366

(22) Filed: Sep. 13, 2018

(65) Prior Publication Data
US 2019/0077155 A1 Mar. 14, 2019

(30) Foreign Application Priority Data

Sep. 14, 2017 (JP) ................... 2017-176601

(51) Int. Cl.
*B41J 2/16* (2006.01)
*B41J 2/14* (2006.01)
*C09D 171/00* (2006.01)

(52) U.S. Cl.
CPC .......... *B41J 2/1606* (2013.01); *B41J 2/1433* (2013.01); *B41J 2/162* (2013.01); *B41J 2/164* (2013.01); *B41J 2/1609* (2013.01); *B41J 2/1642* (2013.01); *C09D 171/00* (2013.01)

(58) Field of Classification Search
CPC ...... B41J 2/1606; B41J 2/1609; B41J 2/1642; B41J 2/162; B41J 2/1433; B41J 2/164; C09D 171/00
See application file for complete search history.

(56) References Cited

U.S. PATENT DOCUMENTS

| | | | |
|---|---|---|---|
| 6,296,946 B1 * | 10/2001 | Kotera | B41J 2/14 427/490 |
| 2005/0001879 A1 | 1/2005 | Miyajima et al. | |
| 2005/0088485 A1 | 4/2005 | Tamahashi et al. | |

FOREIGN PATENT DOCUMENTS

JP   2007106024 A   4/2007

OTHER PUBLICATIONS

IP.com search (Year: 2019).*
U.S. Appl. No. 16/130,351, filed Sep. 13, 2018.
U.S. Appl. No. 16/130,300, filed Sep. 13, 2018.
U.S. Appl. No. 16/144,362, filed Sep. 27, 2018.

* cited by examiner

*Primary Examiner* — Lisa Solomon
(74) *Attorney, Agent, or Firm* — Kim & Stewart LLP

(57) ABSTRACT

An ink jet head includes a nozzle plate substrate having a nozzle for ejecting ink toward a recording medium and an oil repellent film on a surface of the nozzle plate substrate, the surface facing the recording medium. The oil repellent film comprises a fluorine compound having a first end and a second end, the first end comprising a perfluoroalkyl group with 3 to 5 carbon atoms per each molecule of the fluorine compound, and a ratio of a density of $CF_2$ groups in the oil repellent film with respect to a density of $CF_3$ groups in the oil repellent film is between 1.5 and 4.0 as measured by X-ray photoelectron spectroscopic analysis.

12 Claims, 7 Drawing Sheets

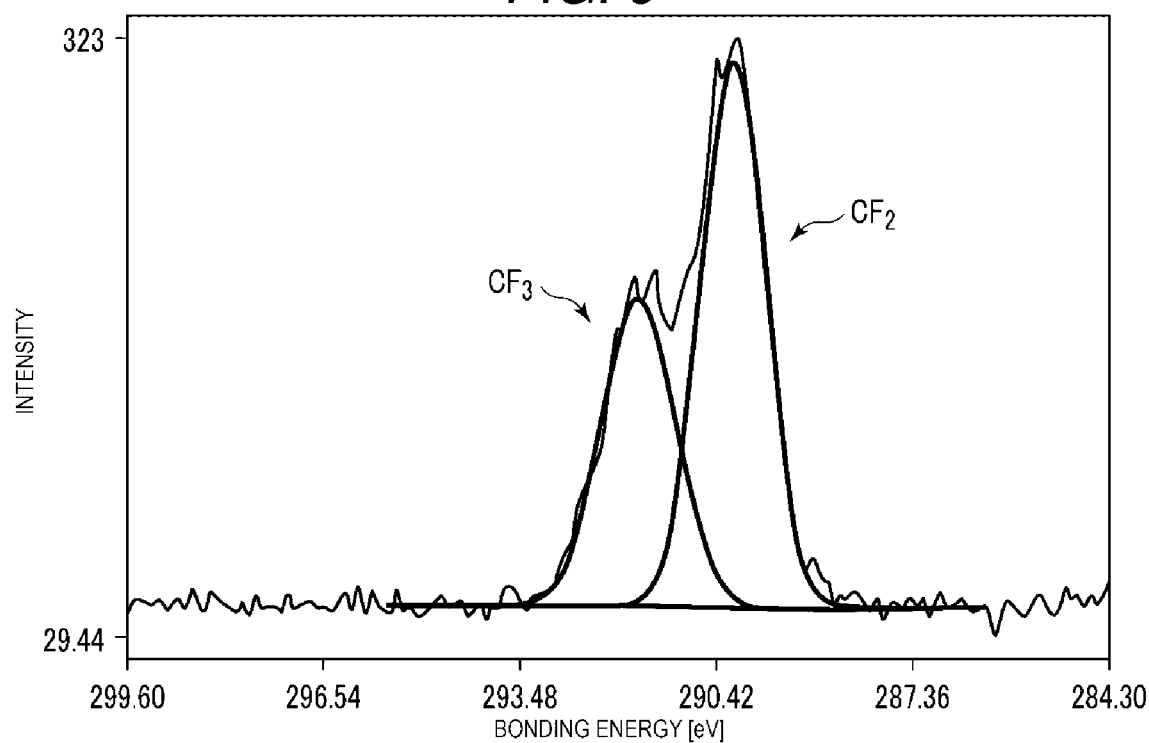

INK JET HEAD AND INK JET PRINTER

CROSS-REFERENCE TO RELATED APPLICATION

This application is based upon and claims the benefit of priority from Japanese Patent Application No. 2017-176601, filed Sep. 14, 2017, the entire contents of which are incorporated herein by reference.

FIELD

Embodiments described herein relate generally to an ink jet head and an ink jet printer.

BACKGROUND

In an ink jet head, ink is pressurized by a piezoelectric element and ink droplets are ejected through nozzles in a nozzle plate. An ink (or oil) repellent film applied on a surface of the nozzle plate prevents the ink from adhering to the nozzle plate. In an existing ink jet head, an oil repellent film is formed of a fluorine compound on the surface of the nozzle plate substrate, for example, by an application method or a vapor deposition method. The fluorine compound based film has a surface energy that acts to repel oils.

DESCRIPTION OF THE DRAWINGS

FIG. 9 depicts XPS spectra obtained for a surface of an oil repellent film included in a nozzle plate according to an example.

DETAILED DESCRIPTION

In general, according to one embodiment, an ink jet head includes a nozzle plate substrate having a nozzle for ejecting ink toward a recording medium and an oil repellent film on a surface of the nozzle plate substrate, the surface facing the recording medium. The oil repellent film comprises a fluorine compound having a first end and a second end, the first end comprising a perfluoroalkyl group with 3 to 5 carbon atoms per each molecule of the fluorine compound, and a ratio of a density of CF2 groups in the oil repellent film with respect to a density of CF3 groups in the oil repellent film is between 1.5 and 4.0 as measured by X-ray photoelectron spectroscopic analysis.

Hereinafter, an embodiment will be described with reference to drawings.

Figure 1:
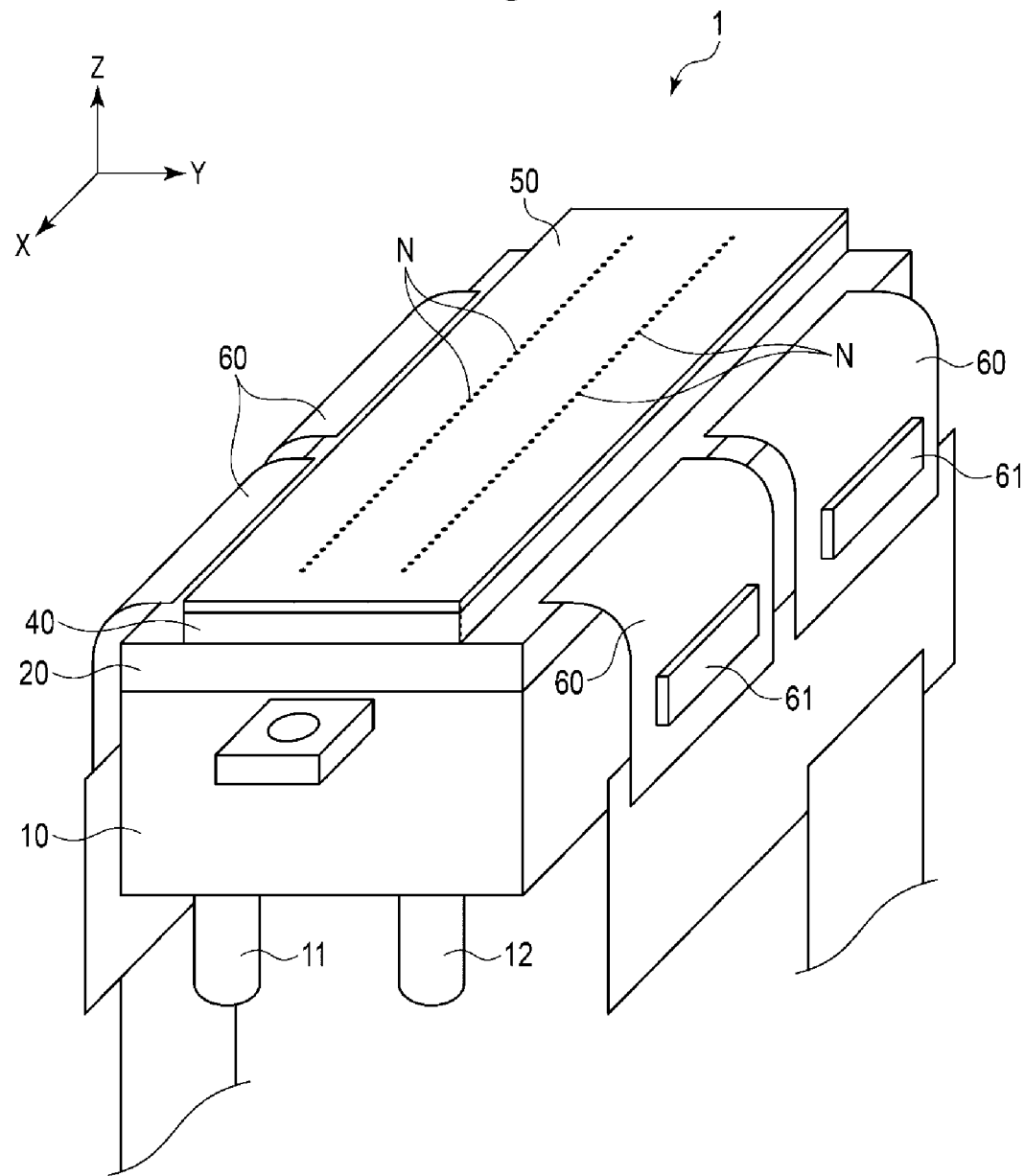
FIG. 1 is a perspective view of an ink jet head according to an embodiment.

FIG. 1 is a perspective view of an ink jet head 1 that is mounted on a head carriage of an ink jet printer. In the following description, an orthogonal coordinate system including an X axis, a Y axis, and a Z axis is used. The directions represented by the arrows in the drawing are assumed to be positive directions for convenience. The X axis direction is parallel to a width of recording medium. The Y axis direction is a direction in which the recording medium is transported. The Z axis direction is perpendicular to the recording medium.

The ink jet head 1 will be described with reference to FIG. 1. The ink jet head 1 includes an ink manifold 10, an actuator substrate 20, a frame 40, and a nozzle plate 50.

The actuator substrate 20 has a rectangular shape that is long in the X axis direction. Examples of a material of the actuator substrate 20 include alumina ($Al_2O_3$), silicon nitride ($Si_3N_4$), silicon carbide (SiC), aluminum nitride (AlN), and lead zirconate titanate (PZT: Pb(Zr, Ti)$O_3$).

The actuator substrate 20 is overlaid on the ink manifold 10 so as to block an opening end of the ink manifold 10. The ink manifold 10 is connected to an ink cartridge via an ink supply tube 11 and an ink returning tube 12.

The frame 40 is attached onto the actuator substrate 20. The nozzle plate 50 is attached onto the frame 40. Nozzles N are provided in the nozzle plate 50 at fixed intervals in the X axis direction so as to form two arrays along the Y axis.

Figure 2:
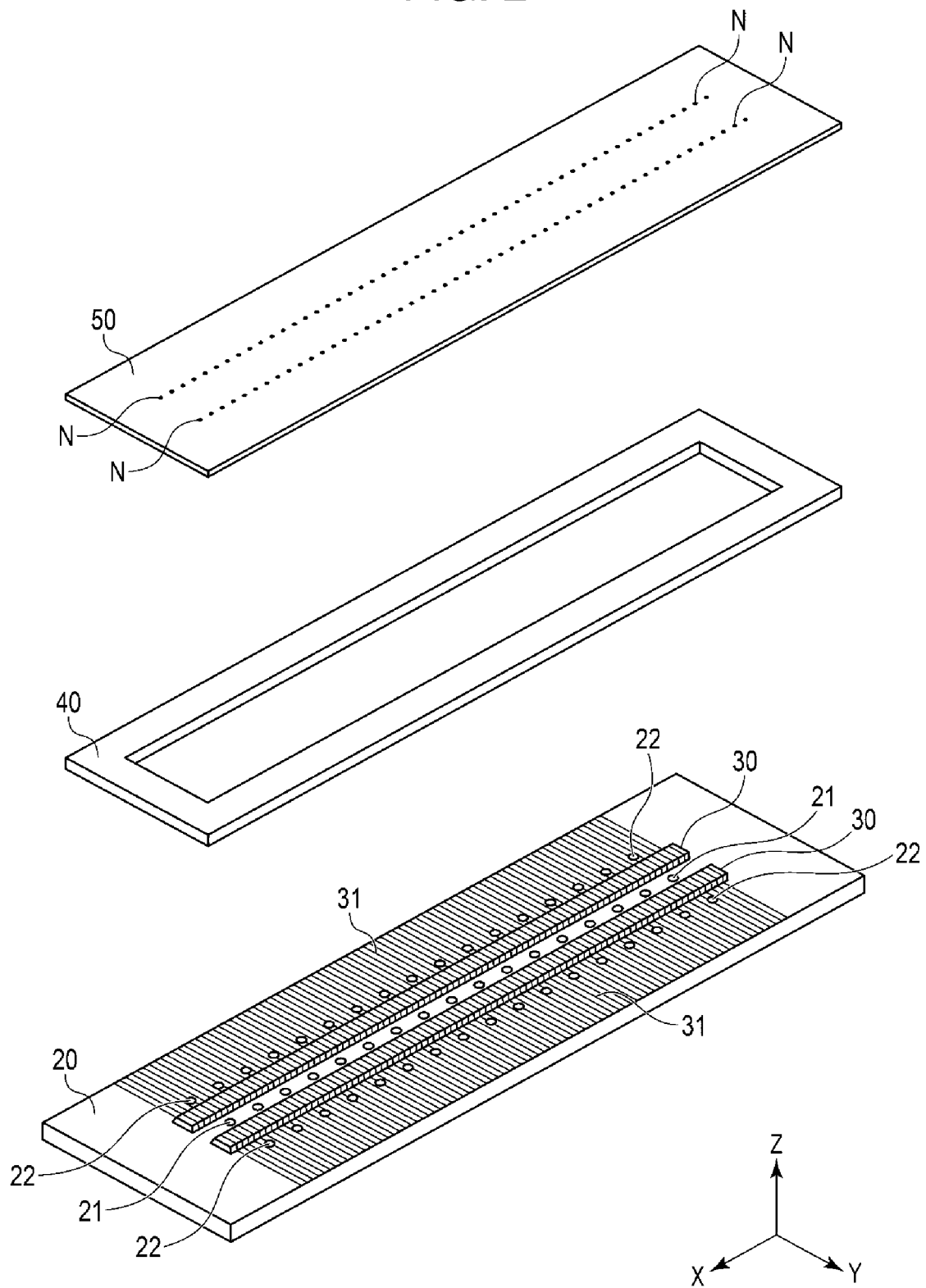
FIG. 2 is an exploded perspective view of an actuator substrate, a frame, and a nozzle plate of an ink jet head according to the embodiment.

FIG. 2 is an exploded perspective view of the actuator substrate 20, the frame 40, and the nozzle plate 50 of the ink jet head 1. In the example embodiment described herein, the ink jet head 1 is a side shooter type having shear mode shared walls.

Ink supply ports 21 are provided in the actuator substrate 20 at intervals along the X axis direction so as to form an array at the center in the Y axis direction. Ink discharge ports 22 are provided in the actuator substrate 20 at intervals in the X axis direction so as to form the arrays on either positive and negative directions in the Y axis direction relative to the array of the ink supply ports 21.

Actuators 30 are provided between the array of the ink supply ports 21 at the center and one of the arrays of the ink discharge ports 22. These actuators 30 form an array extending in the X axis direction. The actuators 30 are also provided between the array of the ink supply ports 21 at the center and the other array of the ink discharge ports 22. These actuators 30 also form an array extending in the X axis direction.

Each array of actuators 30 includes a first piezoelectric body and a second piezoelectric body laminated on the actuator substrate 20. Examples of materials of the first and second piezoelectric bodies include lead zirconate titanate (PZT), lithium niobite (LiNbO$_3$), and lithium tantalite (LiTaO$_3$). The first and second piezoelectric bodies are polarized in mutually opposite directions in the thickness direction.

Grooves each extend in the Y axis direction and are arrayed along the X axis direction in the body laminated on the actuator substrate 20. These grooves are opened on the side of the second piezoelectric body and have a depth that is greater than the thickness of the second piezoelectric body. Hereinafter, portions between adjacent grooves in the laminated body will be referred to as "channel walls." The channel walls each extend in the Y axis direction and are spaced from each other in the X axis direction. A groove between two adjacent channel walls serves as an ink channel through which ink is distributed.

Electrodes are formed at side walls and the bottom of the ink channel. The electrodes are connected to a wiring pattern 31 that extends in the Y axis direction.

A protection film (not particularly depicted) is formed on the surface of the actuator substrate 20 to cover the electrodes and the wiring pattern 31 except for a connection part for connecting to a flexible print substrate 60. The protection film may be made of inorganic insulating films and organic insulating films.

The frame 40 has an opening that is smaller than the actuator substrate 20 and is larger than an area of the actuator substrate 20 on which the ink supply ports 21, the actuator 30, and the ink discharge ports 22 are provided. The frame 40 may be made of ceramic. The frame 40 is bonded to the actuator substrate 20 with an adhesive, for example.

The nozzle plate 50 includes a nozzle plate substrate 51 and an oil repellent film 52 on a medium facing surface, from which the ink is ejected via the nozzles N. The nozzle plate substrate may be made of a resin film such as a polyimide film.

The nozzle plate 50 is larger than the opening in the frame 40. The nozzle plate 50 is bonded to the frame 40 with an adhesive, for example.

Nozzles N are provided in the nozzle plate 50. The nozzles N form two arrays so as to correspond to the ink channels. The nozzles N each have a diameter that increases in the ink channel direction from the recording medium facing surface. The diameter of each nozzle N is set to a predetermined value in accordance with the desired amount of ink to be ejected. The nozzles N can be formed by using excimer laser.

The actuator substrate 20, the frame 40, and the nozzle plate 50 are integrated as illustrated in FIG. 1 and form a hollow structure. A region surrounded by the actuator substrate 20, the frame 40, and the nozzle plate 50 serves as an ink distribution chamber. The ink is cycled such that the ink is supplied to the ink distribution chamber from the ink manifold 10 through the ink supply ports 21 and passes through the ink channels, and excessive ink returns from the ink discharge ports 22 to the ink manifold 10. Some of the ink is ejected from the nozzles N as it is flowing through the ink channels and is used for printing.

A flexible print substrate 60 is connected to the wiring pattern 31 at a position on the actuator substrate 20 and outside the frame 40. A drive circuit 61 for driving the actuator 30 is mounted on the flexible print substrate 60.

Hereinafter, operations of the actuator 30 will be described. Here, the ink channel in the middle of three adjacent ink channels is focused upon, and operations thereof will be described. The ink channel in the middle may be referred to as a middle ink channel and the ink channels on either side of the middle ink channel may be referred to as side ink channels. Electrodes corresponding to the three adjacent ink channels are referred to as electrodes A, B, and C (electrodes A and C correspond to the side ink channels and electrode B corresponds to the middle ink channel). When an electric field is not being applied in the direction orthogonal to channel walls, the channel walls are in an erect state.

For example, a voltage pulse with a potential that is higher than potentials of the electrodes A and C is applied to the electrode B to cause an electric field in the direction orthogonal to the channel walls. In this manner, the channel walls are driven in a shear mode, and the channel walls of the middle ink channel are deformed such that the volume of the middle ink channel expands.

A voltage pulse with a potential that is higher than the potential of the electrode B is applied to the electrodes A and C to cause an electric field in the direction orthogonal to the channel walls. In this manner, the channel walls are driven in the shear mode, and the channel walls of the middle ink channel are deformed such that the volume of the middle ink channel contracts. Due to the expansion and the contraction, a variable pressure is applied to the ink in the middle ink channel, and the ink is ejected from the nozzles N corresponding to the middle ink channel onto the recording medium in conjunction with pressure increases.

In some embodiments, the nozzles are divided into three groups such that the driving operation is performed in three cycles under time division control, and printing on the recording medium is thus performed.

Figure 3:
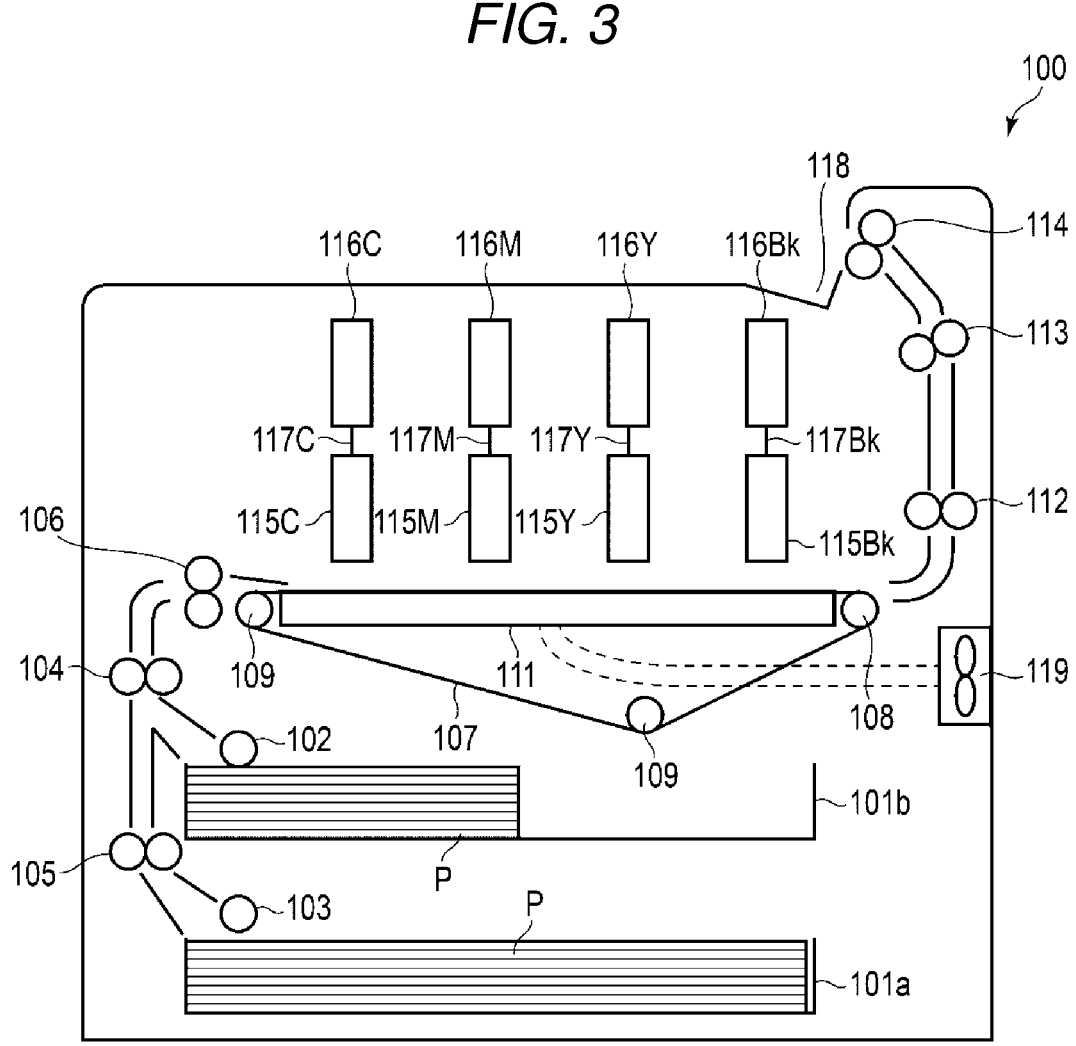
FIG. 3 is a schematic diagram of an ink jet printer according to the embodiment.

FIG. 3 is a schematic diagram of an ink jet printer 100. The ink jet printer 100 depicted in FIG. 3 includes a case body with a sheet discharge tray 118. In the case body, cassettes 101a and 101b, sheet supply rollers 102 and 103, transport roller pairs 104 and 105, a registration roller pair 106, a transport belt 107, a fan 119, a negative pressure chamber 111, transport roller pairs 112, 113, and 114, ink jet heads 115C, 115M, 115Y and 115Bk, ink cartridges 116C, 116M, 116Y and 116Bk, and tubes 117C, 117M, 117Y, and 117Bk are installed.

The cassettes 101a and 101b accommodate recording media P with different sizes. The sheet supply roller 102 or 103 takes the recording medium P corresponding to a selected recording medium size from the cassette 101a or 101b and transports the recording medium P to the transport roller pairs 104 and 105 and the registration roller pair 106.

Tensile force is applied to the transport belt 107 by a drive roller 108 and two driven rollers 109. Holes are provided at fixed intervals on the surface of the transport belt 107. The negative pressure chamber 111 coupled to the fan 119 for adsorbing the recording medium P to the transport belt 107 is installed inside the transport belt 107. The transport roller pairs 112, 113, and 114 are installed on the downstream side of the transport belt 107 in the transport direction. In some embodiments, a heater is installed for heating a printed layer formed on the recording medium P on a transport path from the transport belt 107 to the sheet discharge tray 118.

In FIG. 3, four ink jet heads that eject the ink onto the recording medium P in accordance with image data are arranged above the transport belt 107. Specifically, the ink jet head 115C that ejects cyan (C) ink, the ink jet head 115M that ejects magenta (M) ink, the ink jet head 115Y that ejects yellow (Y) ink, and the ink jet head 115Bk that ejects black (Bk) ink are arranged in this order from the upstream side. Each of the ink jet heads 115C, 115M, 115Y, and 115Bk is the ink jet head 1 described with reference to FIGS. 1 and 2.

The cyan (C) ink cartridge 116C, the magenta (M) ink cartridge 116M, the yellow (Y) ink cartridge 116Y, and the black (Bk) ink cartridge 116Bk that respectively accommodate corresponding ink are installed above the ink jet heads 115C, 115M, 115Y, and 115Bk. The ink cartridges 116C, 116M, 116Y, and 116Bk are coupled to the ink jet heads 115C, 115M, 115Y, and 115Bk by the tubes 117C, 117M, 117Y, and 117Bk, respectively.

Next, image forming operations of the ink jet printer 100 will be described.

First, an image processing unit (not specifically depicted) of the ink jet printer 100 starts image processing for recording, generates image signals corresponding to image data, and generates control signals for controlling operations of various rollers, the negative pressure chamber 111, and the like.

The sheet supply roller 102 or 103 selects the recording medium P one by one from the cassette 101a or 101b controlled by the image processing unit and transports the recording medium P to the transport roller pairs 104 and 105 and the registration roller pair 106. The registration roller pair 106 corrects skew of the recording medium P and transports the recording medium P at a predetermined timing.

The negative pressure chamber 111 suctions air via the holes in the transport belt 107. Therefore, the recording medium P can be transported one sheet after another to a position below the ink jet heads 115C, 115M, 115Y, and 115Bk as the transport belt 107 moves while the recording medium P is attached to the transport belt 107.

The ink jet heads 115C, 115M, 115Y, and 115Bk eject the ink in synchronization with a timing at which the recording medium P is transported controlled by the image processing unit. In this manner, a color image is formed at a desired position on the recording medium P.

The transport roller pairs 112, 113, and 114 discharge the recording medium P on which the image has been formed to the sheet discharge tray 118. If the heater is installed in the transport path from the transport belt 107 to the sheet discharge tray 118, the print layer formed on the recording medium P may be heated by the heater. In particular, if the recording medium P is impermeable, the heating of the print layer enhances adherence of the printing layer to the recording medium P.

Figure 4:
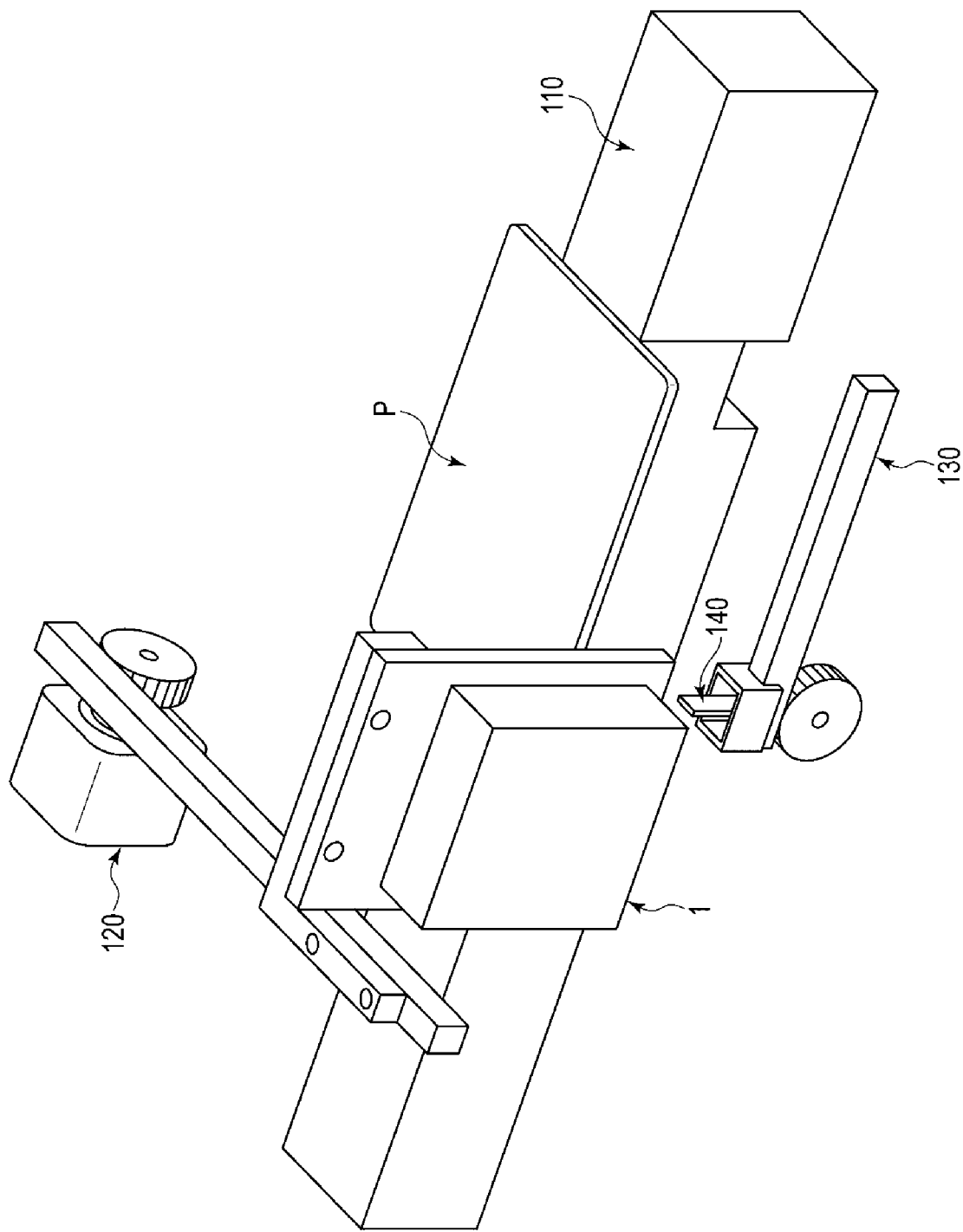
FIG. 4 is an exploded perspective view of an ink jet printer according to the embodiment.

FIG. 4 is an exploded perspective view of the ink jet printer 100. FIG. 4 illustrates the ink jet head 1 described above, a medium holding mechanism 110, a head moving mechanism 120, a blade moving mechanism 130, and a wiping blade 140.

The medium holding mechanism 110 holds the recording medium P such as a recording sheet so as to face the ink jet head 1. The medium holding mechanism 110 also has functions as a recording sheet transferring mechanism that transfers the recording medium. The medium holding mechanism 110 includes the transport belt 107, the drive roller 108, the driven roller 109, the negative pressure chamber 111, and the fan 119 (depicted in FIG. 3). The medium holding mechanism 110 transfers the recording medium P in a direction parallel to the print surface of the recording medium P while the recording medium P faces the ink jet head 1. During this transfer, the ink jet head 1 ejects ink droplets from the nozzles and performs printing on the recording medium P.

The head moving mechanism 120 moves the ink jet head 1 to a printing position during printing. The head moving mechanism 120 moves the ink jet head 1 to a cleaning position during cleaning.

The wiping blade 140 faces the recording medium P and rubs the surface of the nozzle plate and removes the ink from the recording medium facing surface.

The blade moving mechanism 130 moves the wiping blade 140. Specifically, the blade moving mechanism 130 causes the wiping blade 140 to abut on the recording medium facing surface of the nozzle plate 50 and moves the wiping blade 140 on the surface after the head moving mechanism 120 moves the ink jet head 1 to the cleaning position. In this manner, the wiping blade 140 removes the ink adhering to the recording medium facing surface of the nozzle plate 50.

In some embodiments, the wiping blade 140 and the blade moving mechanism 130 may be omitted.

In the ink jet head 1, an oil repellent film is formed on the medium facing surface of the nozzle plate substrate 51. The oil repellent film may be formed of a fluorine compound.

Figure 5:
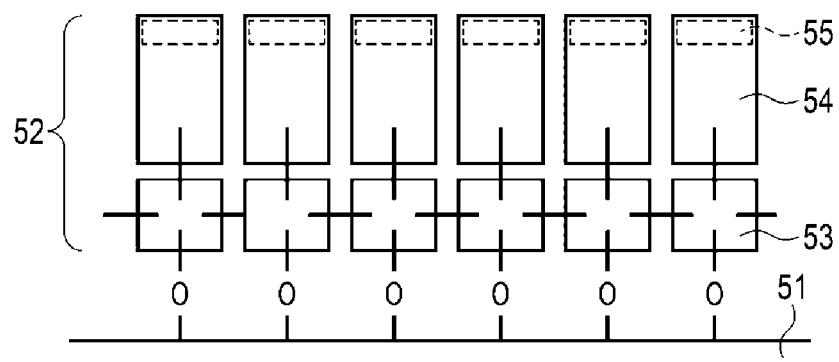
FIG. 5 is a schematic diagram of an oil repellent film in an ink jet head according to the embodiment.

FIG. 5 is a schematic diagram of an oil repellent film 52 on the medium facing surface of the nozzle plate substrate 51.

The oil repellent film 52 contains a fluorine compound that has a terminal perfluoroalkyl group 55 with 3 to 5 carbon atoms. If the oil repellent film 52 is analyzed by the X-ray photoelectron spectroscopy (XPS) method, a peak of a CF2 group and a peak of a CF3 group are detected, and a ratio of a peak area of the CF2 group with respect to a peak area of the CF3 group is within a range from 1.5 to 4.0.

Here, the XPS method will be described. When a substance is irradiated with a X ray having energy about several keV, bonded electrons in an atomic orbital absorb energy of the X ray and are then released as photoelectrons. The following relationship is met between bonding energy $E_b$ of the bonded electrons and kinetic energy $E_k$ of the photoelectrons.

$$E_b = h_v - E_k - \phi_{sp}$$

In the above equation, $h_v$ represents the energy of the X ray, and $\phi_{sp}$ represents a work function of a spectroscope.

Thus, it is possible to obtain the bonding energy $E_b$ of the bonded electrons based on the kinetic energy $E_k$ of the photoelectrons if the energy $h_v$ of the X ray is known (that is, a wavelength of the X ray is known). Since the bonding energy $E_b$ of the bound electrons is unique to each element, constituent elements of the substance can be analyzed. Since a shift in the bonding energy measured by the spectroscope corresponds to a change in a chemical bonding state and a valence electron state (such as an oxidation number) of the constituent elements, it is possible to analyze the chemical bonding state of the constituent elements.

If the oil repellent film 52 is analyzed by the XPS method, a ratio of the peak area of the CF2 group with respect to the peak area of the CF3 group is within the range from 1.5 to 4.0 as described above. Such an oil repellent film 52 exhibits excellent ink repellency. Therefore, an oil repellent film 52 can repel ink even under small surface tensile force, for example, surface tensile force of equal to or less than 25 mN/m.

The number of carbon atoms of the terminal perfluoroalkyl group of the fluorine compound contained in the oil repellent film 52 is within a range from 3 to 5. Therefore, the oil repellent film 52 having 3 to 5 carbon atoms in the terminal perfluoroalkyl group exhibit ink repellency and excellent in terms for environmental and safety standpoints.

In the example embodiment described herein, the fluorine has a site 53 bonded to the nozzle plate substrate 51 and the terminal perfluoroalkyl group 55. For example, the fluorine compound is a linear molecule that has the bonding site 53 at one terminal and has the perfluoroalkyl group 55 at the other terminal. The fluorine compound does not contain a perfluoroalkyl group with 6 or more carbon atoms.

The bonding site 53 is a portion of the compound which may form a chemical bond to the nozzle plate substrate 51, for example, by a reaction with a functional group on the surface of the nozzle plate substrate 51. The bonding site 53 may itself include a reactive functional group. In this case, the bonding site 53 is bonded to the nozzle plate substrate 51 by the reactive functional group reacting with the functional group on the surface of the nozzle plate substrate 51. Examples of the reactive functional group include an unsaturated hydrocarbon group such as an epoxy group, an amino group, a methacryl group, or a vinyl group or a mercapto group. Examples of the functional group on the surface of the nozzle plate substrate include a hydroxyl group, an ester bonding group, an amino group, or a thiol group. Alternatively, the bonding site 53 may be an alkoxysilane group. In this case, the bonding site 53 is bonded to the nozzle plate substrate 51 by a silanol group generated by hydrolysis of the alkoxysilane group reacting with the functional group, such as a hydroxyl group, that is present on the surface of the nozzle plate substrate 51.

The bonding sites 53 of the fluorine compound are also bonded to bonding sites of adjacent fluorine compounds on the nozzle plate substrate 51. In some embodiments, each bonding site 53 further contains one or more silicon atoms between the reactive functional group and the terminal perfluoroalkyl group 55, and in the adjacent fluorine compounds on the nozzle plate substrate 51, the bonding sites 53 are bonded to each other with a siloxane linkage (Si—O—Si).

The terminal perfluoroalkyl group 55 is a linear perfluoroalkyl group, for example. The number of carbon atoms in the terminal perfluoroalkyl group 55 can be selected in a range from 3 to 5 (referred to as C3 to C5). The terminal perfluoroalkyl group 55 preferably erects in the normal direction of the nozzle plate substrate 51.

The fluorine compound may further include a spacer linking group 54 that is between the site 53 (bonding site 53) which bonds to the nozzle plate substrate 51 and the terminal perfluoroalkyl group 55. Presence of such a spacer linking group 54 can be advantageous for providing a film in which the terminal perfluoroalkyl group 55 are erect in a direction normal to the nozzle plate substrate 51. Examples of the spacer linking group 54 include a perfluoropolyether group.

Examples of a fluorine compound include compounds represented by Formula (1) or (2) represented below.

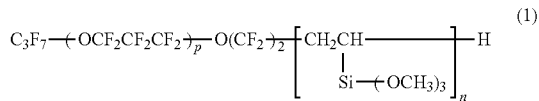
(1)

In Formula (1), p is a value from 1 to 50, and n is a value from 1 to 10. While each molecule of the fluorine compound has only integer values for p (1 to 50), each molecule of the fluorine compound in a film does not necessarily need to have the same p value and, when referring to the composition of a film, collectively, the value of p need not be an integer value and may represent an averaged value of all fluorine compound molecules in the film (or a measured region of the film) that is a natural number.

In Formula (2), p is also a value of 1 to 50 in the same manner as was described as within the context of Formula (1).

The coating structure is obtained as follows, for example. In the example embodiment described herein, it is assumed that a hydroxyl group will initially be present on an exposed surface of the nozzle plate substrate 51 and that the fluorine compound contains an alkoxysilane group at the bonding site 53.

However, if the nozzle plate substrate 51 is made of a resin film such as a polyimide film, as described above then the nozzle plate substrate 51 might not sufficiently provide the surface hydroxyl groups necessary for bonding to the fluorine compound for film formation. Therefore, it may be preferable to perform a pre-processing on the nozzle plate substrate 51 prior to the formation of the oil repellent film 52.

In some embodiments, the pre-processing is an ion plasma processing on the surface of the nozzle plate substrate 51. The ion plasma processing can be performed by using oxygen gas, argon gas, or mixture gas thereof, for example. The ion plasma processing is preferably performed by using mixture gas of oxygen gas and argon gas.

The surface of the nozzle plate substrate 51 is modified by performing the ion plasma processing in the atmosphere containing oxygen to provide additional hydroxyl group sites. This ion plasma processing, when performed in the atmosphere containing argon in addition to oxygen, further acts to remove contaminants adhered to the surface of the nozzle plate substrate 51 and not necessarily easily removable by reaction(s) with oxygen plasma.

Next, the fluorine compound is supplied to the surface of the nozzle plate substrate 51 by a vapor deposition method such as a vacuum deposition method. Alternatively, the fluorine compound may be applied directly to the surface of the nozzle plate substrate 51 in a wet processing step.

Then, hydrolysis of the alkoxysilane group in the fluorine compound supplied to the surface of the nozzle plate substrate 51 occurs.

Once hydrolysis of the alkoxysilane group has occurred, a silanol group is generated. The silanol group and the hydroxyl group present on the medium facing surface of the nozzle plate substrate 51 react via a dehydration condensation. In this manner, the nozzle plate substrate 51 and the fluorine compound are bonded to each other via a siloxy group (Si—O—) of silicon atoms in the bonding site 53. Silicon atoms at the bonding site 53 of the fluorine compound are also bonded to bonding sites of adjacent fluorine compounds by siloxane bonding (Si—O—Si).

In this example, the terminal perfluoroalkyl group 55 is bonded to the silicon atoms at the bonding site 53 via a perfluoropolyether group (a spacer linking group 54). The spacer linking group 54 permits the terminal perfluoroalkyl groups 55 be erect in a direction normal to the surface of the nozzle plate substrate 51. In this arrangement, terminal perfluoroalkyl groups 55 provide ink repellency. If the number of carbons is 3 (C3), the terminal perfluoroalkyl group 55 can be represented as CF3-CF2-CF2- and ink repellency of a CF3 group is higher than that of a CF2 group.

Higher fluid repellency is achieved as the fluorine compound has longer perfluoroalkyl group. However, toxicity of the fluorine compound increases as the number of carbon atoms in the perfluoroalkyl group increases. Therefore, use of the fluorine compound that has a perfluoroalkyl group with eight or more carbon atoms is inhibited. Use of the fluorine compound that has a perfluoroalkyl group with a large number of carbon atoms has been gradually inhibited even if the number of carbon atoms thereof is equal to or less than seven.

It is environmentally safer if the fluorine compound has a perfluoroalkyl group with a smaller number of carbon atoms. However, the oil repellent film is formed by using a fluorine compound that has a perfluoroalkyl group with a small number of carbon atoms, for example, four or less carbon atoms, typically exhibits less ink repellency as compared with an oil repellent film formed of a fluorine compound that has a perfluoroalkyl compound with a large number of carbon atoms, for example, seven or more carbon atoms is used.

According to the method described above, ion plasma processing is performed in advance on the nozzle plate substrate 51, and the reaction between the nozzle plate substrate 51 and the bonding site of the fluorine compound is then caused. Therefore, an increased portion of the terminal perfluoroalkyl group 55 erects in the normal direction of the nozzle plate substrate 51 if the fluorine compound that has the terminal perfluoroalkyl group 55 with 3 to 5 carbon atoms is used.

If the thus-obtained oil repellent film 52 is analyzed by the XPS method, the peak of the CF2 group and the peak of the CF3 group are detected, and a ratio of the peak area of the CF2 group with respect to the peak area of the CF3 group is within a range from 1.5 to 4.0. In one example, the ratio is about 1.5 if the number of carbon atoms in the terminal perfluoroalkyl group 55 is 3. The ratio approaches 4.0 as the number of carbon atoms in the terminal perfluoroalkyl group 55 approaches 5.

In this manner, a large number of CF3 groups are present in the surface region of the oil repellent film 52. As described above, ink repellency of the CF3 group is higher than that of the CF2 group. Therefore, the oil repellent film 52 uses the fluorine compound that has the terminal perfluoroalkyl group with a smaller number of carbon atoms and still exhibits excellent ink repellency.

With the structure described above, each bonding site 53 of the fluorine compound is bonded to the surface of the nozzle plate substrate 51, and the bonding sites 53 are preferably bonded to each other. Therefore, the terminal perfluoroalkyl group 55 merely swings in the lateral direction and does not separate from the surface of the oil repellent film 52 even if cleaning using the wiping blade 140 is repeated. Therefore, the ink repellency is not degraded.

EXAMPLES

Comparative Example 1

An evaporation source that includes a fluorine compound (substance name: 1H,1H-perfluorooctylmethacrylate) (hereinafter, referred to as a fluorine compound $C_7F_{15}$) represented by the following formula was prepared. This evaporation source and a nozzle plate substrate were installed in a vacuum deposition apparatus, and the fluorine compound was deposited on a recording medium facing surface of the nozzle plate substrate by the vacuum deposition method. A polyimide film was used as the nozzle plate substrate. An oil repellent film was formed on the recording medium facing surface of the nozzle plate substrate, thereby producing a nozzle plate.

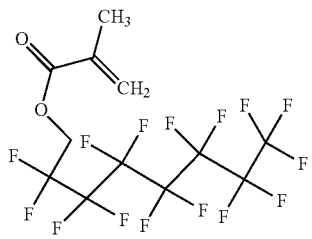 [SMILES: C=C(C)C(=O)OCC(F)(F)C(F)(F)C(F)(F)C(F)(F)C(F)(F)C(F)(F)C(F)(F)F]

Comparative Example 2

A nozzle plate was produced by a method that is similar to that described in Comparative Example 1 other than that a fluorine compound (substance name: 2,2,3,3,4,4,4-heptafluorobutylmethacrhlate) (hereinafter, referred to as a fluorine compound $C_3F_7$) represented by the following formula is used.

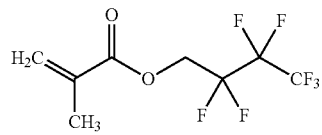

The oil repellent films included in the nozzle plates according to Comparative Examples 1 and 2 were analyzed by the XPS method.

Figure 6:
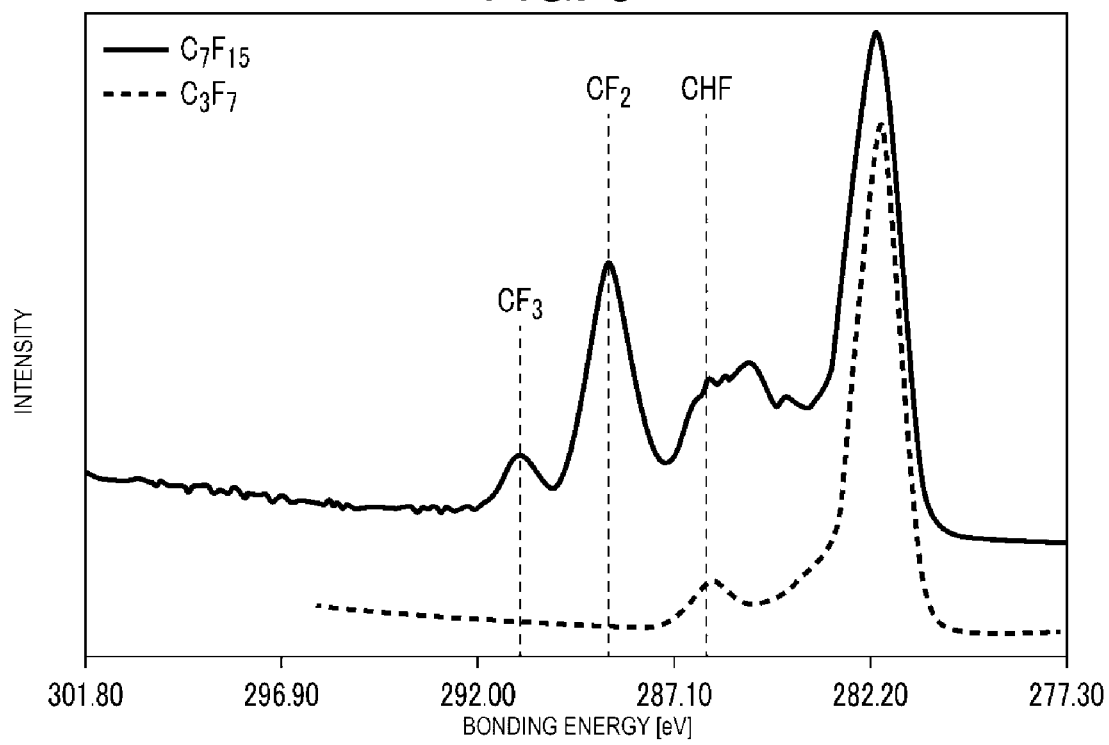
FIG. 6 depicts XPS spectra obtained for surfaces of oil repellent films included in nozzle plates according to Comparative Examples 1 and 2.

FIG. 6 illustrates XPS spectra obtained for the surfaces of the oil repellent films included in the nozzle plates according to Comparative Examples 1 and 2. In FIG. 6, the horizontal axis represents bonding energy, and the vertical axis represents intensity of released photoelectrons.

As illustrated in FIG. 6, the peak of the CF2 group and the peak of the CF3 group were detected when the surface of the oil repellent film of the nozzle plate according to Comparative Example 1 was analyzed by the XPS method. The peak of the CF2 group and the peak of the CF3 group were not detected when the surface of the oil repellent film of the nozzle plate according to Comparative Example 2 was analyzed by the XPS method.

Figure 7:
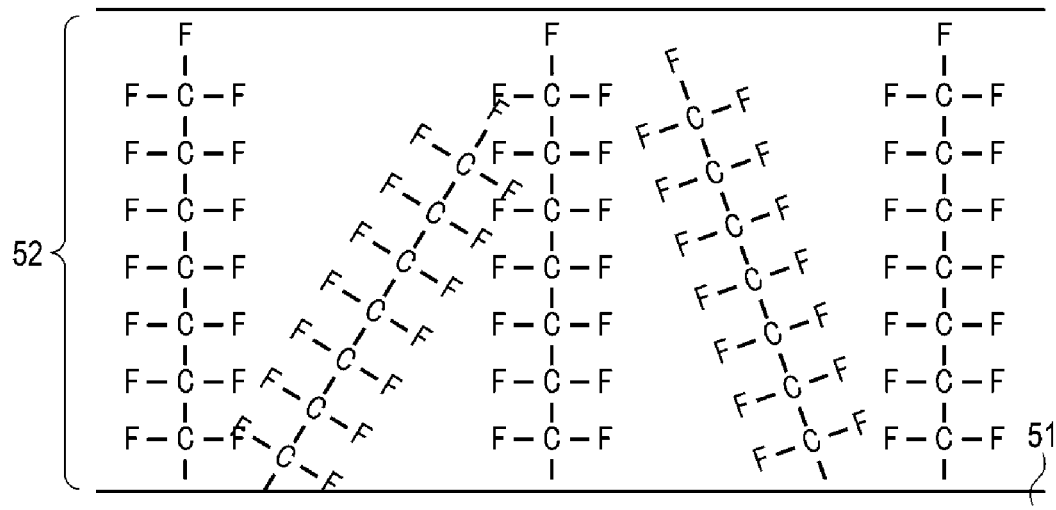
FIG. 7 depicts a schematic structure of an oil repellent film included in a nozzle plate according to Comparative Example 1.

It may be considered that the oil repellent film of the nozzle plate obtained in Comparative Example 1 had the structure illustrated in FIG. 7.

FIG. 7 depicts a schematic structure of the oil repellent film included in the nozzle plate according to Comparative Example 1.

As illustrated in FIG. 7, it is possible to interpret, without requiring or limiting the present disclosure to any specific molecular mechanism of formation, that a proportion at which the $C_7F_{15}$ group erected in the normal direction of the nozzle plate substrate was high in the oil repellent film in Comparative Example 1 in which the peak of the CF2 group and the peak of the CF3 group were detected.

Figure 8:
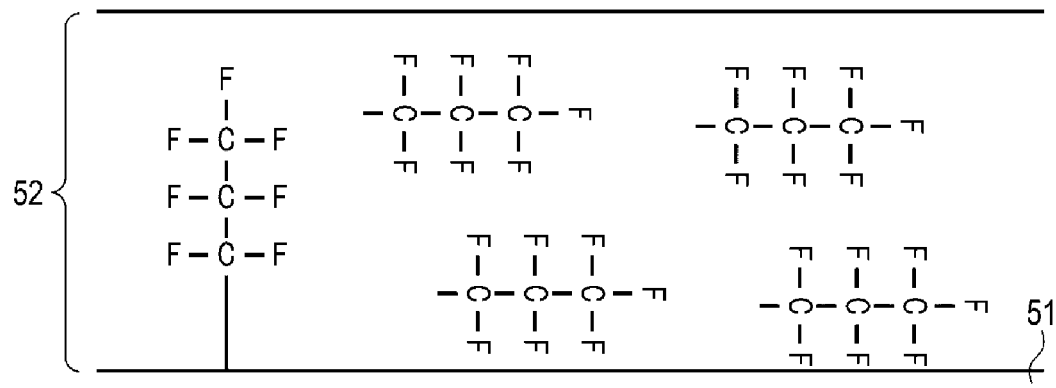
FIG. 8 depicts a schematic structure of an oil repellent film included in a nozzle plate according to Comparative Example 2.

It is possible to interpret from the results illustrated in FIG. 6, without requiring or limiting the present disclosure to any specific molecular mechanism of formation, that the oil repellent film of the nozzle plate obtained in Comparative Example 2 had the structure illustrated in FIG. 8.

FIG. 8 depicts a schematic structure of the oil repellent film included in the nozzle plate according to Comparative Example 2.

As illustrated in FIG. 8, it is possible to interpret, without requiring or limiting the present disclosure to any specific molecular mechanism of formation, that a proportion at which the $C_3F_7$ group erected in the normal direction of the nozzle plate substrate was significantly low in the oil repellent film according to Comparative Example 2 in which the peak of the CF2 group and the peak of the CF3 group were not detected.

Example

An evaporation source that includes a fluorine compound represented by the following formula was prepared. Then, ion plasma processing was performed in advance on a nozzle plate substrate. A polyimide film was used as the nozzle plate substrate. The nozzle plate substrate and the evaporation source were installed in a vacuum deposition apparatus, and the fluorine compound was deposited on a recording medium facing surface of the nozzle plate substrate by the vacuum deposition method. An oil repellent film was formed on the recording medium facing surface of the nozzle plate substrate as described above.

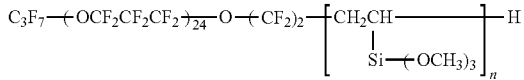

The oil repellent film included in the nozzle plate according to the example was analyzed by the XPS method.

FIG. 9 illustrates XPS spectra obtained for the surface of the oil repellent film included in the nozzle plate according to the example. In FIG. 9, the horizontal axis represents bonding energy, and the horizontal axis represents intensity of released photoelectrons.

Further, a peak area of the CF2 group and a peak area of the CF3 group were calculated on the basis of the measurement results. As a result, a ratio of the peak area of the CF3 group with respect to the sum of the peak area of the CF2 group and the peak area of the CF3 group was 37%, and a ratio of the peak area of the CF2 group with respect to the aforementioned sum was 63%. That is, the peak area of the CF2 group when the peak area of the CF3 group was assumed to be 1 was about 1.7.

Relationships between the number of times the nozzle plates according to Comparative Example 2 and the example were rubbed with a wiping blade and speeds at which the nozzle plates repelled the ink were examined.

The speeds at which the nozzle plates repelled the ink were measured as follows. Sample nozzle plates (having oil repellent films with the width of 15 mm thereon) were prepared. The nozzle plates were held at one end and substantially immersed in ink while in a substantially erect state (e.g., perpendicular to an upper surface of the ink), the nozzle plates were then pulled out from the ink by nozzle plate length of 45 mm, and time required for the ink to disappear from the now exposed parts (45 mm of the plate) after the pulling out was measured.

The length of the oil repellent films immersed with the ink is represented by L (here, L=45 mm), the time required for the ink to disappear from the exposed part is represented by T (seconds), and the speed Rr (as mm/second) at which ink flows off the oil repellent film is defined as follows.

$$Rr(\text{in mm/second}) = L/T = 45 \text{ mm}/T$$

The nozzle plates with the oil repellent films applied thereto were rubbed with a wiping blade multiple times under a load of 13 gf (gram force). Thereafter, the speeds Rr at which the oil repellent films repelled the ink were measured by a method similar to that described above.

The speed Rr of the nozzle plate according to the example was higher than that of the nozzle plate according to Comparative Example 2 in a state before being rubbed with the wiping blade.

Ink repellency of the nozzle plate according to Comparative Example 2 was degraded in a stage in which the number of times the nozzle plate was rubbed with the wiping blade was less than 1000. Degradation of ink repellency of the nozzle plate according to the example was suppressed even when the number of times the nozzle plate was rubbed with the wiping blade was as large as 6000 times.

As described above, the ink jet head according to the example exhibited excellent ink repellency in an initial state, and the ink repellency was less degraded even after the recording medium facing surface of the nozzle plate was rubbed with the wiping blade.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ink jet head, comprising:
   a nozzle plate substrate having a nozzle for ejecting ink toward a recording medium; and
   an oil repellent film on a surface of the nozzle plate substrate, the surface facing the recording medium, wherein
   the oil repellent film comprises a fluorine compound having a first end and a second end, the first end comprising a perfluoroalkyl group with 3 to 5 carbon atoms per each molecule of the fluorine compound, and
   a ratio of a density of CF2 groups in the oil repellent film with respect to a density of CF3 groups in the oil repellent film is between 1.5 and 4.0 as measured by X-ray photoelectron spectroscopic analysis.

2. The ink jet head according to claim 1, wherein a density of $CF_6$ groups in the oil repellent film and a density of $CF_7$ groups in the oil repellent film are substantially zero as measured by X-ray photoelectron spectroscopic analysis.

3. The ink jet head according to claim 1, wherein
   the second end of the fluorine compound comprises a bonding group bonded to the nozzle plate substrate and a bonding group of an adjacent fluorine compound bonded to the nozzle plate substrate.

4. The ink jet head according to claim 3, wherein
   the nozzle plate substrate includes a functional group on a surface thereof, the functional group being selected from a hydroxyl group, an ester bonding group, an amino group, and a thiol group, and
   the bonding group comprises a reactive functional group selected from an epoxy group, an amino group, a methacryl group, a vinyl group, and a mercapto group.

5. The ink jet head according to claim 3,
   wherein the fluorine compound further has a spacer linking group linking the first and second ends.

6. The ink jet head according to claim 5, wherein the perfluoroalkyl group at the first end is $C_3F_7$, and the spacer linking group is —(OCF2CF2CF2)$_{24}$-O—(CF2)$_2$-.

7. The ink jet head according to claim 5, wherein the perfluoroalkyl group at the first end is $C_3F_7$, and the spacer linking group is —(OCF2CF2CF2)$_p$-O—(CF2)$_2$-, p being a value from 1 to 50.

8. The ink jet head according to claim 1, wherein
   the fluorine compound is bonded to a surface of the nozzle plate substrate by a siloxane linkage.

9. The ink jet head according to claim 1, wherein the nozzle plate substrate is made of resin.

10. An ink jet printer comprising:
    a nozzle plate substrate having a nozzle for ejecting ink toward a recording medium; and
    an oil repellent film on a surface of the nozzle plate substrate, the surface facing the recording medium;
    a medium holding mechanism that faces the nozzle plate substrate and holds a recording medium; and a wiping blade that rubs the surface, wherein
the oil repellent film comprises a fluorine compound having a first end and a second end, the first end comprising a perfluoroalkyl group with 3 to 5 carbon atoms per each molecule of the fluorine compound, and
a ratio of a density of CF2 groups in the oil repellent film with respect to a density of CF3 groups in the oil repellent film is between 1.5 and 4.0 as measured by X-ray photoelectron spectroscopic analysis.

11. The ink jet printer according to claim 10, wherein the second end of the fluorine compound comprises a bonding group bonded to the nozzle plate substrate and a bonding group of an adjacent fluorine compound bonded to the nozzle plate substrate.

12. The ink jet printer according to claim 11, wherein the fluorine compound further has a spacer linking group linking the first and second ends.

* * * * *